Patented Nov. 20, 1951

2,575,851

UNITED STATES PATENT OFFICE 2,575,851

METHOD OF MAKING CARPET UNDERLAY

Harold Taylor, Trenton, N. J., assignor to Alexander Smith, Incorporated, a corporation of New York No Drawing. Application May 9, 1950, Serial No. 161,019

2 Claims. (Cl. 260—727)

The present invention relates to improvements in the composition of rug carpet underlays and in a method of making the underlays.

One object of the present invention is to provide a new and improved rug carpet underlay made of a material which is comparatively inexpensive to manufacture, but which nevertheless has physical characteristics highly suitable for the intended purpose, such as superior modulus characteristics, good wearing qualities and properties affording walking comfort, and which lends itself easily and efficiently to processing by ordinary rubber milling or mixing machinery.

Another object is to provide a method of making the improved rug carpet underlay above described.

In accordance with certain features of the present invention, the rug underlay of the present invention is made from finely divided scrap rubber and a substantially dry compounded uncured elastomeric binder, mixed thoroughly together by a Banbury mixer, or as far as certain aspects of the invention are concerned, by a rubber mill or other well known or suitable type of rubber mixing machine. This operation not only mixes the different ingredients together, but also masticates them, so that there is intimate and thorough blending of these ingredients. The mixture is then subjected to curing conditions to hold the particles of this scrap rubber resiliently together and to cause said binder to form a coherent springy matrix having many desirable properties sought for in rug carpet underlay material.

In producing the rug carpet underlay of the present invention, scrap rubber is employed which may come from any suitable commercial source, such as from tires, tire tubes, sponges, latex sponges, mechanical goods, tubings or hose. The most desirable scrap is from tire treads, from mechanical goods, or tire peel.

The scrap rubber without being devulcanized is cut up into suitable size pieces ranging from dust size to a size having a maximum dimension no greater than the thickness of the ultimate underlay produced. The scrap may be cut up into this finely divided form by a two-roll mill.

The granular scrap is then mixed with an uncured substantially dry elastomeric compound binder and more desirably a rubber compound containing compounding agents necessary to extend the rubber, to impart certain desirable properties to the product and to effect the cure of the rubber compound. The compounding agents added to the rubber stock to form the binder material are a vulcanizer, an accelerator, and a filler and reinforcer. Other desirable compounding agents are an antioxidant and a softener, and in certain cases a peptizing agent.

The amount of binder should desirably be at least 14% by weight of the mixture. The cost of the scrap rubber being much less than that of the rubber binder compound, it is desirable to use as much of this scrap material as is possible, compatible with the production of an underlay having the desired physical qualities. For practical purposes, a mixture of scrap rubber and uncured rubber compound having 20 to 25% by weight of uncured rubber compound is suitable.

The mixture of granular scrap rubber and substantially dry or solid uncured rubber compound is desirably blended and masticated in a Banbury mixer, but as far as certain aspects of the invention are concerned, may be blended in a rubber mill or other suitable mixing apparatus. The mixture is then calendered out into a continuous sheet of desirable width and thickness by conventional rubber calender equipment. The thickness of the underlay sheet produced may be between ⅛" to ½", but is desirably ¼". The width and length of the sheet will depend on the size of the equipment employed to calender and cure the material.

The continuous sheet is then vulcanized, as for example, in a large hot air oven, which cures the binder properly. The cured sheet is then ready for use as an underlay.

The dry binder compound and the dry scrap rubber, mixed, blended, milled and mechanically processed as described, forms a substantially homogeneous mixture which when cured coalesces into a resilient mass. The resulting underlay will not be as discrete as in the case of an underlay, in which the elastomeric or rubber binder is in latex form when added to the rubber scrap.

The binder, as described, is desirably made from substantially dry natural rubber stock, such as crepe or smoked sheet, suitably compounded. However, as far as certain aspects of the invention are concerned, it may be made of any suitable compounded elastomer which is substantially dry, which can be milled, blended and mixed with the rubber scrap in a conventional rubber mill, Banbury mixer or other suitable processing machine of this general type and which requires curing. The binder compound may, for example, be made of chloroprene (neoprene) or of a butadiene-styrene copolymer, as for instance GR-S containing approximately 45% of styrene in substantially dry form. Also the binder, as far as certain aspects of the invention are concerned, may be made of reclaimed rubber.

The following example illustrates certain ways in which the principle of the invention has been applied, but it is not to be construed as limiting the invention.

*Example 1*

The binder material is produced having the following formulation:

|  | Parts by weight |
|---|---|
| Smoked rubber sheet | 100.00 |
| 2-naphthalene thiol (RPA #2) | .3 |
| Light process petroleum oil | 2.5 |
| Carbon black | 50.0 |
| Zinc oxide | 5.0 |
| Stearic acid | .5 |
| Polytrimethyl quinoline | 1.0 |
| Sulphur | 3.0 |
| Tetramethylthiurium disulphide | .1 |
| Mercaptobenzothiazole | 1.0 |
|  | 163.4 |

In the above formulation, the 2-naphthalene thiol serves as a peptizing agent, the light process oil as a softener, the stearic acid as an activator, the carbon black as a filler and reinforcing agent, the polytrimethyl quinoline as an antioxidant, the sulphur and tetramethylthiurium disulphide as curing or vulcanizing agents, the mercaptobenzothiazole as an accelerator, and the zinc oxide as a secondary accelerator serving to facilitate vulcanization and to improve the tensile strength of the product.

The binder ingredients are mixed in accordance with conventional rubber mixing practice, as for example, in a two-roll mill.

The scrap comprises #1 tire peel broken down into size to pass through a screen of ¼" mesh. The scrap is cut down to this size by a two-roll breaker mill. The large particles are screened out and returned to the mill.

Eighty (80) pounds of the uncured binder material mixed as described and three hundred and twenty (320) pounds of the finely divided scrap rubber are charged into a cold #9 Banbury and blended for several revolutions. The blend is dischraged and moved by mechanical conveyors to a feeder which feeds the blend steadily into a horizontal linoleum or rubber calender having rolls wide enough to produce a continuous sheet nine feet wide. The sheet is calendered to ¼" thick gauge and run directly into a shelf in a curing oven. After the different shelves in the curing oven are filled with the different sheets, the doors are closed and a cure of a thirty minute rise and a twenty minute hold at 298° is given. The sheets are removed from the oven while hot and allowed to cool. They are then trimmed and finished as a rug or carpet underlay. This underlay will weight about 5 pounds per square yard.

*Example 2*

|  | Parts by weight |
|---|---|
| Smoked rubber sheet | 100.00 |
| 2-naphthalene thiol (RPA #2) | .3 |
| Light process petroleum oil | 2.5 |
| Carbon black | 50.0 |
| Zinc oxide | 5.0 |
| Sulfur | 4.0 |
| Polytrimethyl quinoline | 1.0 |
| Piperidinium pentamethylenedithiocarbamate | 4.0 |
| Tetramethyl thiuram disulfide | 0.5 |

This binder will cure in several hours at 180° F. or may be cured at a temperature of 100° F. if the curing period is extended to several days. These curing conditions are advantageous in some instances because they permit the use of the curing rooms ordinarily used for linoleum or printed felt floor covering. The composition is used and formed as in Example 1.

The compositions described produce a rug or carpet underlay which, compared with that of the prior art comprising sponge rubber or fibrous materials, is substantialy less expensive to manufacture, has superior physical properties such as modulus characteristics conducive to greater wear and life and affords better walking comfort.

What is claimed is:

1. A method of manufacturing a rug carpet underlay, which comprises mixing with scrap rubber particles ranging from dust size to the size of the thickness of the underlay to be produced an uncured substantially dry compounded elastomeric binder selected from the class consisting of natural rubber, chloroprene and butadiene-styrene copolymers, in an amount equal to 14 to 30% by weight of the mixture of scrap rubber particles and said binder, forming the mixture into a sheet ranging from one-eighth inch to one-half inch thick and curing said binder into a resilient mass suitable for use as an underlay.

2. A method as described in claim 1, said binder being a natural rubber compounded with a vulcanizing agent, an accelerating agent and a filler and reinforcing agent.

HAROLD TAYLOR.

REFERENCES CITED

The following references are of record in the file of this patent:

UNITED STATES PATENTS

| Number | Name | Date |
|---|---|---|
| 1,250,418 | Belden | Dec. 18, 1917 |
| 1,508,900 | Stochs | Sept. 16, 1924 |
| 1,816,822 | Bell | Aug. 4, 1931 |
| 1,988,902 | Keppeler | Jan. 22, 1935 |